May 10, 1938.  L. G. SIMPSON  2,117,221
METHOD AND APPARATUS FOR POSITIONING MULTIFOCAL LENS BLANKS
Filed Jan. 3, 1935  2 Sheets-Sheet 1
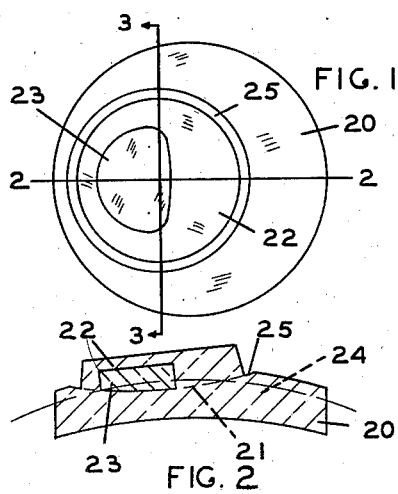
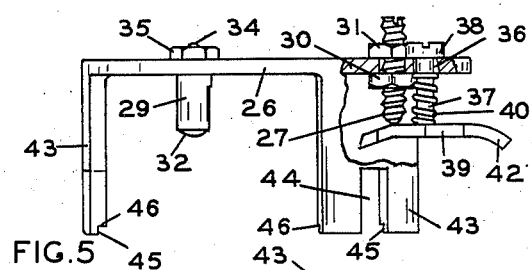
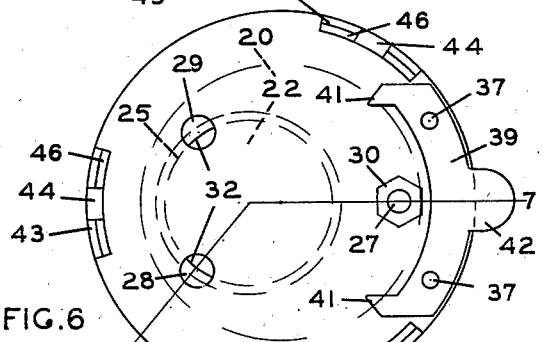
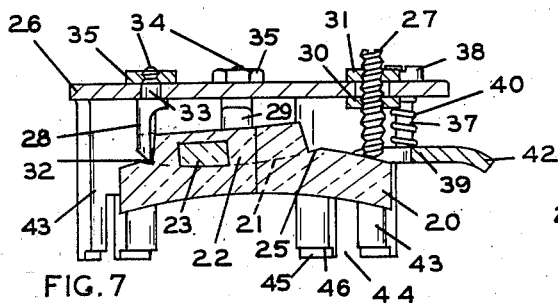
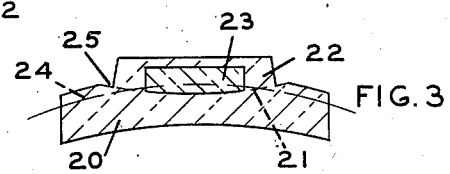
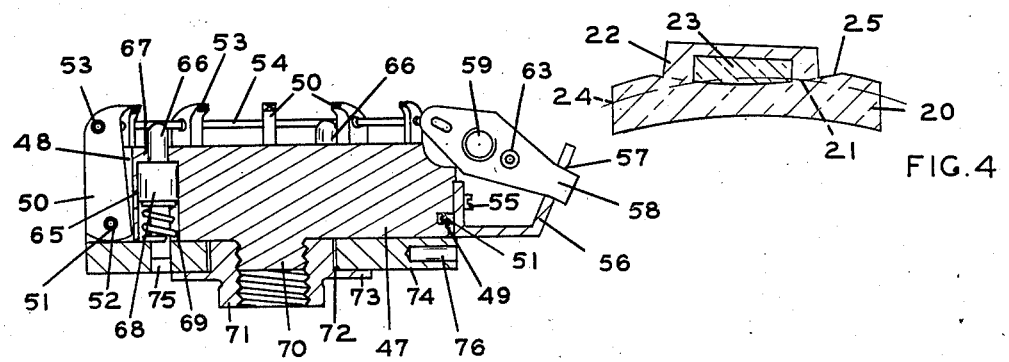
LEON G. SIMPSON
INVENTOR
BY *G. A. Ellestad*
ATTORNEY May 10, 1938.    L. G. SIMPSON    2,117,221
METHOD AND APPARATUS FOR POSITIONING MULTIFOCAL LENS BLANKS
Filed Jan. 3, 1935    2 Sheets-Sheet 2
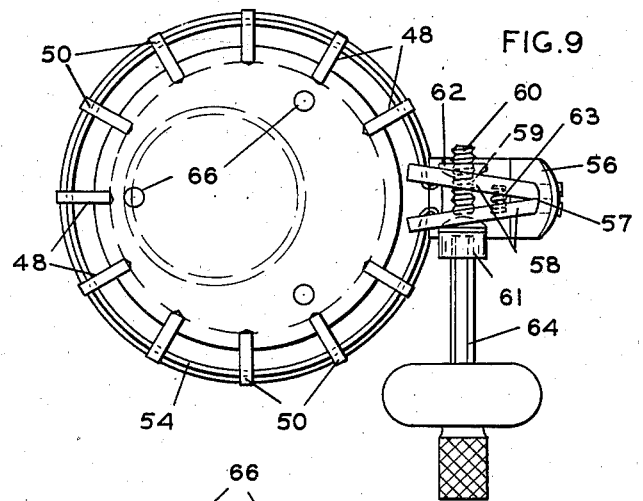
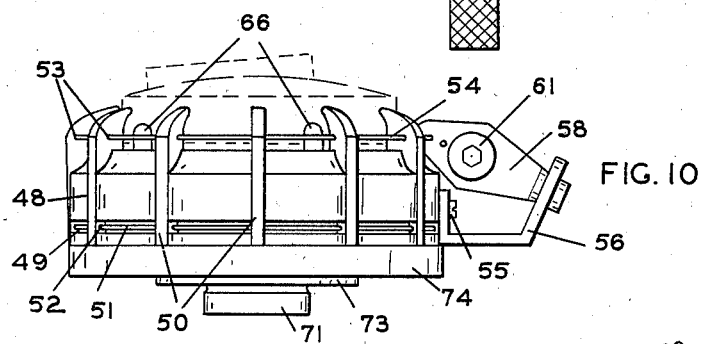
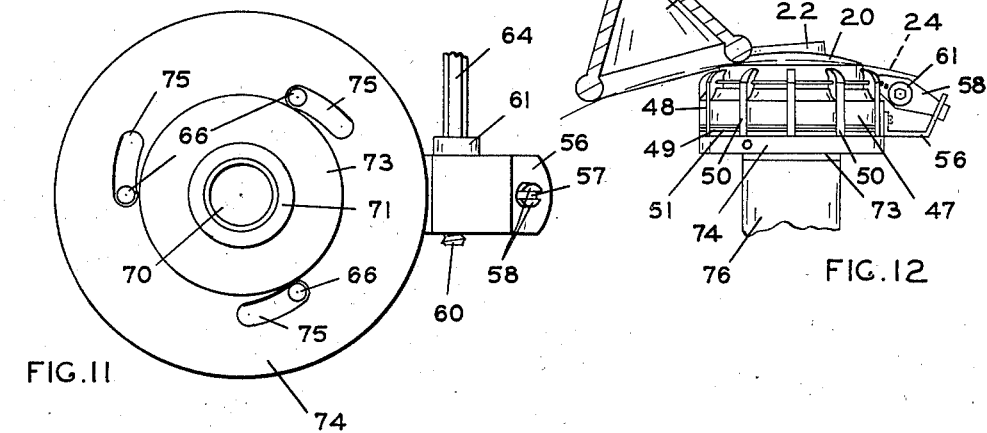
LEON G. SIMPSON
INVENTOR
BY *G. A. Ellestad*
ATTORNEY Patented May 10, 1938

2,117,221

UNITED STATES PATENT OFFICE 2,117,221

METHOD AND APPARATUS FOR POSITIONING MULTIFOCAL LENS BLANKS

Leon G. Simpson, Rochester, N. Y., assignor to Bausch & Lomb Optical Company, Rochester, N. Y., a corporation of New York Application January 3, 1935, Serial No. 264

5 Claims. (Cl. 51—277)

The present invention relates to the positioning of multifocal lens blanks for grinding and more particularly to a method and apparatus for accurately positioning multifocal lens blanks of the type where a composite button is fused to a major member.

In the making of one type of multifocal lens a major member is suitably pressed or molded roughly to the desired shape. A carrier button of glass of the same index as the major member is also pressed or molded to shape and is formed with a substantially straight sided depression in which is fused a segment of glass of a different index of refraction. An optical surface is then ground on the composite face of the composite button, an optically finished countersink is formed in the major member and the optically finished face of the composite button is fused into the countersink. The finish curve is then ground and polished on this face. In order to avoid a horizontal prism component in the segment, it is necessary that the center of curvature of the countersink, the center of curvature of the finish curve and the axis of the segment lie in the same plane within limits of the order of one ten-thousandth of an inch.

As all of the exterior surfaces of the composite multifocal lens blank are pressed or molded, they are not accurate within the necessary limits and there is no accurate reference surface to which the finish curve can be ground. The molded curve on the rear surface bears no accurate relation to the curve of the countersink or the position of the composite button and hence there is no way in which the multifocal blank can be pitched or blocked so that the grinding can be carried on automatically. At the present time it is necessary that each lens be ground individually by a skilled lens grinder. During this grinding the lens grinder must make frequent observations and the desired accuracy is obtained by manually moving or angling the grinding tool. It is obvious that this method is at once laborious and expensive.

One of the objects of the present invention is to provide a new method and apparatus for positioning multifocal lens blanks for grinding. Another object is to provide a method and apparatus for positioning multifocal lens blanks using the optically finished countersink surface as a reference surface. A further object is to provide a method and apparatus for positioning a multifocal lens blank so that the center of curvature of the finished surface will lie in the plane passing through the center of curvature of the countersink and the axis of the segment. A further object is to provide a new form of multifocal lens blank. A further object is to provide a new and improved lens blank positioning apparatus. A still further object is to provide a new and improved chuck. Still another object is to provide a new and improved apparatus for positioning a lens in a lens holding chuck. These and other objects and advantages reside in certain novel features of combinations and arrangements of parts and processes as will hereinafter be more fully set forth and pointed out in the appended claims.

Referring to the drawings:

Fig. 1 is a top plan view of a multifocal ophthalmic lens blank according to my invention.

Fig. 2 is a vertical section of same taken on line 2—2 of Fig. 1.

Fig. 3 is a vertical section of same taken on line 3—3 of Fig. 1 showing the composite button centered in the countersink.

Fig. 4 is a vertical section similar to Fig. 3 showing a lens blank in which the composite button is tilted in the countersink.

Fig. 5 is a side elevation of the lens blank positioning member with parts broken away to show interior structure.

Fig. 6 is a bottom plan view of same.

Fig. 7 is a vertical section taken on line 7—7 of Fig. 6 showing the lens in place.

Fig. 8 is a vertical section of the chuck.

Fig. 9 is a top plan view of same.

Fig. 10 is a side elevation of same.

Fig. 11 is a bottom plan view of same.

Fig. 12 is a fragmentary view partly in section showing the relation of the chuck and grinding tool.

One embodiment of this invention is illustrated in the drawings wherein 20 indicates a suitably pressed or molded major member having a countersink 21 formed and optically polished therein. A composite button comprising a carrier button 22 having a segment 23 fused therein, is fused into the countersink 21. Usually the carrier button 22 is of the same glass as the major member 20 while the segment 23 is of glass having a different index of refraction, thus providing the multifocal effect. If the composite button is located centrally of the countersink 21 and the rear face of the major member 20 is in proper relation to the countersink 21, then, as illustrated in Fig. 3, the finish curve 24 can be ground on the composite face with reference to the rear face of the major member 20 without introducing any prismatic error in the segment 23. However, the permissible limits are so small that it is only by rare accident that the position of the composite button in the countersink and the relation of the rear face of the major member 20 to the countersink are such that the surface 24 can be ground with reference to said rear face.

Fig. 4 illustrates a usual condition where the composite button is not located centrally of the countersink. Another usual condition is where the major member 20 is not symmetrical but is slightly prismatic. In either event an attempt to grind the surface 24 with reference to the rear surface of the major member 20, will necessarily result in the introduction of a prism component in the segment 23. According to the present invention an optically accurate reference surface is provided on the major member 20 by grinding the countersink 21 larger than the carrier button 22 so that a narrow annular surface 25 surrounds the carrier button 22. This surface 25 is optically correct and by locating the finished surface curve 24 with respect to this surface, any prismatic error in the segment 23 can be prevented.

The positioning member for cooperating with the multifocal lens blank having the optical surface 25 is shown in Figs. 5, 6, and 7. The positioning member has a flat base plate 26 which is provided with three apertures through which the tripodal supports 27, 28, and 29 extend. The support 27 is threaded throughout its length and is held in position by two nuts 30 and 31 engaging opposite sides of the base plate 26. The two supports 28 and 29 are each provided with a hardened knife edge 32 for engaging the lens and the inward side of each support is cut away as indicated in Figs. 6 and 7 for a reason hereinafter to be described. Each of the supports 28 and 29 is provided with a narrow cylindrical end 33 which extends through the base plate 26 and terminates in a threaded portion 34 which is securely held in a fixed position by a nut 35.

The base plate 26 is also provided with two apertures 36 disposed substantially parallel to the apertures through which the supports 28 and 29 extend. Each of the apertures 36 has a downwardly and rearwardly tapered rear surface. A pin 37 having an enlarged head 38 extends loosely through each aperture 36 and the ends of the pins 37 are connected by a cross plate 39. A compression spring 40 surrounds each pin 37 between the plate 39 and the base plate 26 so that the pins will be urged by the spring to assume a vertical position although they can be rocked rearwardly against the tapered rear surfaces of the apertures 36. The inner face of the plate 39 has two lens engaging points 41 while the outer face has a finger piece 42. Fig. 6 shows the dotted outline of a lens placed in the lens holder. In locating the lens blank in the positioning member, the lens blank is placed so that the inner faces of the supports 28 and 29 engage the edge of the carrier button 22 and the knife edges 32 are in contact with the annular surface 25. The pin 27 forms a third support, engaging the face of the major member 20. The clamping plate 39 presses the lens blank toward the supports 28 and 29 and thus assures accurate positioning of the juncture of the carrier button 22 and the surface 25 against the edges of the supports 28 and 29.

At the outer edge of the base plate 26 are three spaced lugs 43 each having a slot 44 adjacent its end for a purpose to be hereinafter described. Each lug 43 is also provided at its end with a guide surface 45 terminating in a shoulder 46 both for purposes to be described later.

The lens holding chuck is shown in Figs. 8 to 12 and comprises a block 47 having a plurality of spaced parallel slots 48 about its periphery and a peripheral slot 49 adjacent one face. A jaw member 50 is located in each slot and each jaw member 50 is pivotally mounted on a continuous member 51 such as a piano wire, which is located in the peripheral slot 49 and passes through an aperture 52 in each jaw member 50. A second aperture 53 is located at the upper end of each jaw member 50 and a flexible member 54, such as a piano wire, passes through all of the apertures 53.

Fastened to one side of the block 47 by a screw 55 is a bracket 56 having an aperture 57 in which two bent levers 58, fulcrumed one against the other, are movably secured. The ends of the flexible member 54 are secured to the levers 58. Each lever 58 is provided with an aperture 59 through which extends a bolt 60 having a socket head 61. A nut 62 is threaded on the other end of the bolt 60 and held against rotation by a suitable means, not shown, so that turning the bolt 60 serves to tension or relieve the flexible member 54 and thus tighten or release the clamping jaws 50. The spring 63 serves to spread the levers 58 when the tension is to be relieved. A suitable key 64 is provided for operating the bolt 60.

In order to support the rear face of the composite blank the block is provided with three spaced bores 65 in each of which a pin 66 is slidably mounted. Each bore 65 has a reduced neck 67 which cooperates with a shoulder 68 on each pin 66 to limit the movement of the pin in one direction. A spring 69 surrounding the lower end of the pin 66 urges the pin upwardly so that the shoulder 68 is urged toward the neck 67.

The rear face of the block 47 has an extension 70 on which is threaded a nut 71 having a smooth bearing portion 72 and a flange 73. The nut 71 is made much longer than the extension 70 for a purpose to be later described. Mounted on the bearing portion 72 of the nut 71 between the flange 73 and the rear face of the block 47 is a cam plate 74 having one cam slot 75 for each pin 66 and a radial hole 76 adapted to receive a suitable lever for turning the cam plate. One end of each spring 69 bears against the cam plate 70 and the lower end of each pin 66 extends beyond the rear surface of the block into one of the cam slots 75. Thus it is apparent that upon the turning of the cam plate 74 each pin 66 will be tilted and caused to bind in its bore 65 so that the pin 66 can be locked in any desired position.

In the making of a multifocal ophthalmic lens using the method and apparatus, a large countersink 21 is ground and polished in the major member 20 and a composite button, smaller than the countersink is fused in the countersink leaving the optically correct annular surface 25 surrounding the composite button. The blank is then placed and clamped in the lens positioning member, as indicated in Figs. 6 and 7, so that the knife edged supports 28 and 29 engage on the annular surface 25 where the edge of the composite button joins that surface. The spring tension on the clamping plate 39 insures that the composite button will be urged toward the knife edge supports 28 and 29. The lens engaging surface supports 27, 28 and 29 are accurately machined and are located in very precise positions with respect to the guide surfaces 45 and shoulders 46 of the lugs 43. In this way the lens blank is mechanically positioned with extreme accuracy with respect to the guide surfaces 45 and shoulders 46.

The outside diameter of the chuck is the same as the inside diameter of the guide surfaces 45 and the upper face of the chuck near the periphery is accurately machined. The slots 44 in the lugs 43 are wide enough so that the positioning member can be placed on the chuck over the jaw members 50. The guides 45 and the shoulders 46 cooperate with the periphery and upper face of the chuck so that the lens blank is accurately held in a predetermined position with respect to the chuck and can be clamped in that position between the jaws 50 by tightening the nut 61.

The pins 66 press against the rear face of the lens blank and, after the lens blank is clamped in the chuck, the cam plate 74 is turned and the pins are locked. It is preferable that the cam slots 75 tend to urge the bottom of the pins 66 outwardly. The rear face of the lens blank is usually concave as shown in Figs. 2, 3, 4, and 7 and, while pushing the pins down, tends to cam them inwardly at the top. If the cam slots 75 cammed the pins 66 outwardly, there would be a tendency to disturb the position of the lens blank. The lens chuck is then secured on a pivoted support 76 by means of the nut 71 and is moved against the cutting tool 77 which forms the surface 24 thereon. The finish curve 24 is thus ground with reference to the optical surface of the countersink and the prism component of the segment can be controlled. Any desired amount of prism can be ground into the segment merely by selecting the proper relative heights for the supports 28 and 29, and prism in the segment can be entirely avoided by using as supports 28 and 29, members whose knife edges are in a plane parallel to the plane of the shoulders 46.

From the foregoing it is apparent that I have been able to attain the objects of my invention and provide a new and improved method and apparatus for mechanically positioning multifocal ophthalmic lens blanks with great accuracy utilizing the optical surface of the countersink which is ground larger than the segment or composite button. Various modifications can of course be made without departing from the scope of my invention as defined in the appended claims.

I claim:

1. A device for positioning lenses comprising a base, a supporting pivot on said base, two spaced knife edge supports on said base equidistant from said pivot, a clamping member pivotally mounted on said base for holding a lens on said pivot and said supports and resilient means for urging said clamping member into lens holding position.

2. Means for locating a lens in a lens holding chuck comprising a plurality of fixed spaced lugs for locating a lens in a predetermined position, means for clamping said lens in such position and guide means for cooperating with the sides of a chuck for axially locating the lens in the chuck.

3. Means for locating a lens in a lens holding chuck comprising a plurality of fixed spaced lugs for locating a lens in a predetermined position, means for clamping said lens in such position, guide means for cooperating with the sides of a chuck for axially locating the lens in the chuck and stop means to limit the extent of movement of the lens into the chuck.

4. A device for positioning a fused multifocal lens blank having a major member with a large optically finished countersink and a smaller composite button having substantially cylindrical sides fused therein, said device comprising two knife edges, spaced apart a distance less than the diameter of the composite button, for engaging the optically finished countersink surface, a third support for said blank located on the perpendicular bisector of the line between the two knife edges, and clamping means engaging the edge of the lens for urging the composite button against the two knife edges.

5. A device for positioning a multifocal lens blank having a major member provided with a countersink and a composite button smaller than the countersink secured therein, said device comprising a base, two projections on said base, said projections being so spaced as to engage the countersink surface of the major member and the side wall of the composite button, a third projection on said base equidistant from the other two projections for engaging the major member at a point removed from said countersink and means for urging said lens blank toward said two projections so that the two elements will be held in contact with the side walls of the composite button.

LEON G. SIMPSON.